United States Patent [19]
Larranaga et al.

[11] Patent Number: 6,091,044
[45] Date of Patent: Jul. 18, 2000

[54] SYSTEM FOR MONITORING AND CONTROLLING A WELDING/BRAZING OPERATION

[75] Inventors: Javier I. Larranaga, Bristol; Joseph Criniti, New Britain; William A. Newton, Jr., Plainville, all of Conn.

[73] Assignee: General Electric Company, Schenectady, N.Y.

[21] Appl. No.: 09/204,835

[22] Filed: Dec. 3, 1998

[51] Int. Cl.[7] .................................................. B23K 1/00
[52] U.S. Cl. ...................................... 219/85.15; 219/85.14
[58] Field of Search ................................... 219/110, 109, 219/85.14, 85.15, 118, 117.1; 250/227.11

[56] References Cited

U.S. PATENT DOCUMENTS

| | | | |
|---|---|---|---|
| 2,720,575 | 10/1955 | Potter | 219/85.15 |
| 3,191,441 | 6/1965 | Erickson | 219/110 |
| 3,406,272 | 10/1968 | Ehrlich | 219/109 |
| 3,440,389 | 4/1969 | Meyer | 219/110 |
| 3,590,201 | 6/1971 | Basinger | 250/227.11 |
| 4,079,225 | 3/1978 | Warner | 219/110 |
| 4,168,430 | 9/1979 | Denis et al. | 219/110 |
| 4,214,164 | 7/1980 | Traub et al. | 219/110 |
| 4,806,723 | 2/1989 | Beynon et al. | 219/110 |
| 4,849,600 | 7/1989 | Herschitz et al. | 219/110 |
| 4,894,508 | 1/1990 | Glenn et al. | 219/110 |
| 5,681,490 | 10/1997 | Chang . | |
| 5,789,719 | 8/1998 | Pary et al. . | |

FOREIGN PATENT DOCUMENTS

| | | | |
|---|---|---|---|
| 53-28133 | 8/1978 | Japan | 219/85.14 |

*Primary Examiner*—Clifford C. Shaw
*Attorney, Agent, or Firm*—Carmody & Torrance LLP; Carl B. Horton

[57] ABSTRACT

A system for monitoring and controlling a welding/brazing operation on a workpiece having two spaced apart materials with a brazing material disposed therebetween. The system includes a welding apparatus having two spaced apart electrodes. A current is applied through the electrodes and the workpiece sufficient to melt the brazing material. A controller controls the brazing operation by controlling the duration of time during which current flows through the workpiece. A non-contact sensor is coupled to the controller and measures the temperature of the brazing material, so that upon a predetermined temperature measured by the sensor, the controller causes the termination of the current to the workpiece.

8 Claims, 1 Drawing Sheet

SYSTEM FOR MONITORING AND CONTROLLING A WELDING/BRAZING OPERATION

BACKGROUND OF THE INVENTION

The present invention relates generally to resistance welding/brazing operations and in particular, to an improved resistance welding construction that utilizes a non-contact temperature sensor for providing an improved bond between the welded materials and the brazing materials.

The monitoring and control of resistance spot welding devices are well known in the art. Recent prior art constructions have focused on the displacements of the electrodes during welding to achieve an improved welding operation. For example, U.S. Pat. No. 5,789,719 is directed to the fixing of the electrodes against outward displacement when the metal workpieces expand during the application of welding current and permitting inward displacement of the electrodes after the softening of the metal nugget.

However, the prior art resistance welding arrangements are still less than satisfactory. That is, the quality of the resistance weld is sensitive, and therefore dependent on a variety of factors, such as the temperature of the electrodes during use. This temperature may vary, for example, during start-up, where the first few welds may require a longer time to produce a satisfactory weld. Additionally, electrode erosion or electrode wear will produce unsatisfactory results because the current transfer from the electrodes to the material is compromised creating resistance variations. Additionally, variations in the weld can be produced by differences in the material's quality, on the material's finish, or the interface coating on the materials. One or all of these variations can occur at any given moment in a resistance brazing process and the welding operator needs to compensate for the foregoing variables by adjusting the welding control parameters (time, % current, cycles) to achieve satisfactory results. This intensive and accurate human interface in the resistance brazing process can lead to undesirable, and less than satisfactory results.

An attempt at improving the resistance welding operation is described in U.S. Pat. No. 5,672,943. However, this U.S. patent more particularly focuses its improvement methodology on the forces applied to the electrodes during operation to improved the welding process.

It is difficult to evaluate finished products for their quality of braze without sophisticated sonar and/or other techniques, and therefore, it is desirable to provide a system for monitoring and controlling a resistance welding operation that both improves the quality of the products produced thereby while simultaneously reducing the intensive and accurate interfacing needed between the system and the system operator. The present invention disclosed herein achieves the aforementioned and below mentioned objectives.

SUMMARY OF THE INVENTION

Generally speaking, in accordance with the invention, a system for monitoring and controlling a brazing operation on a workpiece is provided. In the preferred embodiment, the system comprises a welding apparatus having spaced apart electrodes. Electrode pressure is utilized to force the workpiece together. A current is applied through the workpiece to create, over time and with pressure, sufficient heat to melt a brazing material in the workpiece. Heat is generated by the resistance of the workpiece to the flow of electricity. The system also includes a controller for controlling the brazing operation, the controller for controlling the duration of time during which current flows through the workpiece. In accordance with the invention, also provided is a non-contact sensor, such as an infrared sensor, that is coupled to the controller, and measures the temperature of the interface or brazing material. In this way, upon a predetermined temperature measured by the sensor, the controller causes the application of current to the workpiece to terminate.

Accordingly, it is an object of the present invention to provide an improved system for monitoring and controlling a resistance welding operation.

Another object of the present invention is to provide an improved product formed by a resistance welding/brazing operation.

Another object of the present invention is to provide a system for monitoring and controlling a resistance welding operation that requires minimal human interfacing.

Another object of the present invention is to provide a system for ensuring a more uniform and properly distributed brazing material in a welded/brazed product.

Still another object of the present invention is to provide the optimal operating parameters for the brazing material, regardless of the duration the resistance welding apparatus has been operating, the corrosion, wear or oxidation on the electrodes or the materials to be brazed.

Yet another object of the present invention is to optimize the production of resistance welded products by virtue of the improved automated process available by utilization of the present invention.

Still other objects and advantages of the invention will in part be obvious and will in part be apparent from the specification, such as preventing material annealing or softening through a brazing operation.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying figure, in which.

DETAILED DESCRIPTION OF THE PREFERRED EMBODIMENTS

Figure 1:
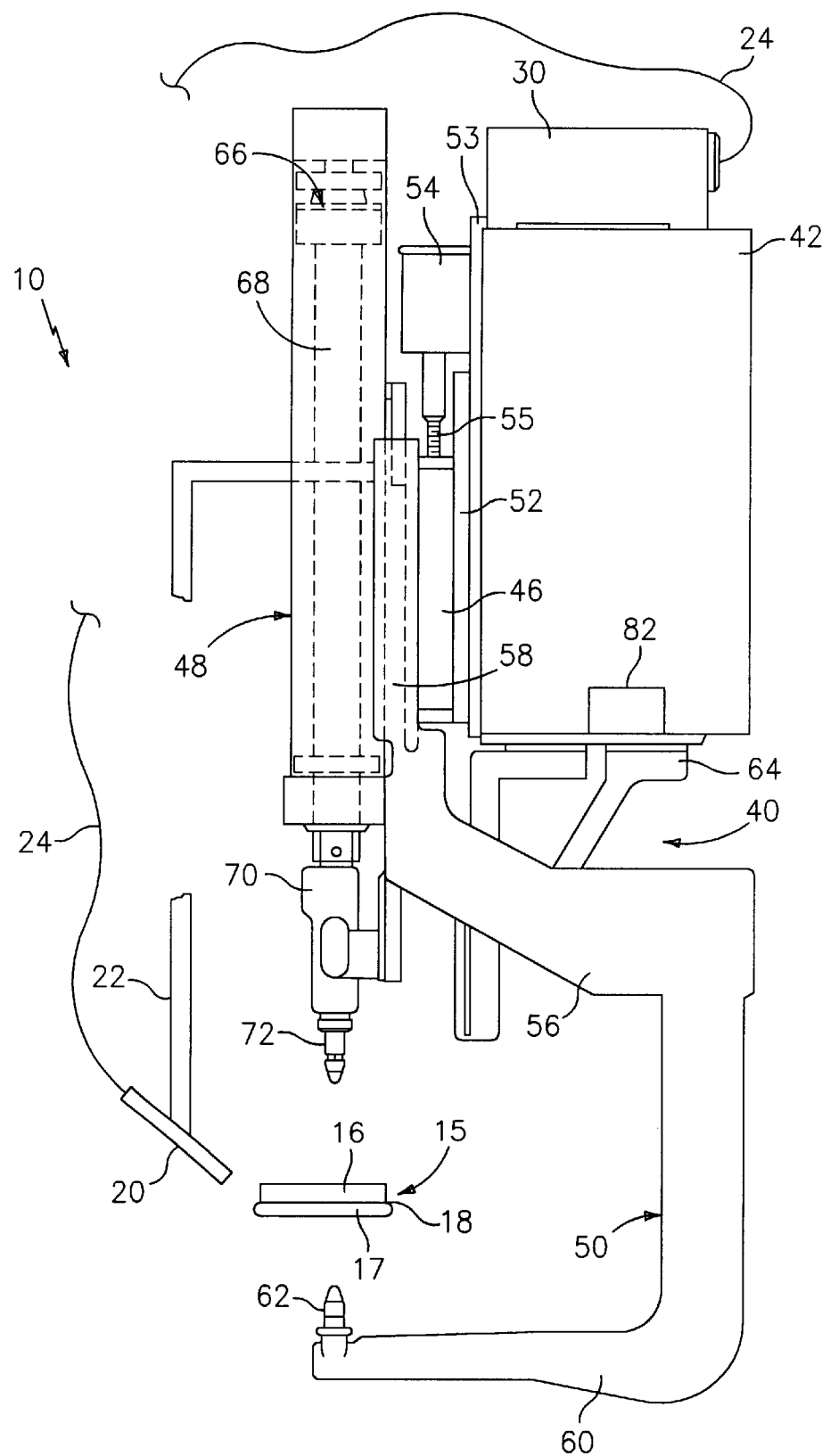
FIG. 1 is a side elevational view of a system for monitoring and controlling a resistance welding operation constructed in accordance with the present invention.

Reference is now made to FIG. 1 in connection with the following disclosure for a detailed description of the preferred embodiment of the present invention. Generally speaking, disclosed in FIG. 1 is system generally indicated at 10, for welding/brazing operations in accordance with the present invention. Hereinafter, reference to a welding or brazing material, apparatus or operation should be understood to mean a "welding/brazing" material, apparatus or operation. System 10 includes a temperature sensor 20 such as infrared sensor, a welding apparatus 40 and a controller 30 for controlling both the welding/brazing operations and for interfacing with sensor 20, details of which will be discussed hereinafter.

Welding apparatus 40 may be any one of a plurality of welding apparatuses currently known, as the present invention is easily adaptable and integratable therewith. As such, the details of welding apparatus will be omitted herein for simplicity although the basic operations thereof will now be discussed for the convenience of the reader.

Welding apparatus 40 is particularly suitable for welding and a brazing operation in particular. Welding apparatus 40 may include a rigid frame 42 with flanges (not shown) extending along one side thereof. Frame 42 may included suitable fastening devices for securing apparatus 40 to a larger housing or stand. A larger housing or platform (not shown) will securedly support welding apparatus 40.

Welding apparatus 40 may include a slide bar 46 to which is fixedly mounted a first arm 48 and a second arm 50. Arms 48 and 50 assist in balancing the pressure exerted on a workpiece 15 by a pair of oppositely mounted electrodes. Slide bar 46 may be reciprocally movable along a rail 52 along a surface 53 of frame 42. A biasing member 54 such as a spring, hydraulic or pneumatic cylinder may be coupled to slide bar 46 via a threaded rod 55. In this manner, slide bar 46 is movable towards workpiece 15.

Second arm 50 includes a mounting bracket 56 having an elongated member 58 mounted to slide bar 46. Extending from the other end of bracket 56 is an "L-shaped" member 60, which may be integrally formed therewith. An end of member 60 includes a conventional electrode holder which supports a conventional electrode 62. Electrical current is delivered via a current supply 82 to electrode 62 by conductive material disposed within the electrode holder and member 60. Electrical current is carried from a supply of electrical power (not shown) through a power bar 64 via a wire (not shown) within second arm 50. The wire is preferably flexible to facilitate movement (if any) of second arm 50. Electrode 62 may be threadably removable from member 60.

By way of example, first arm 48 may include an inner cylinder 66 having a piston-like rod 68 supporting an electrode holder 70 and electrode 72.

In operation, the pressurization of cylinder 66 causes the extension of rod 68 downwardly, thereby causing electrode 72 to move towards workpiece 15. The cylinder is sufficiently pressurized to place a predetermined pressure (or squeezing force) on workpiece 15. The squeezing force sufficiently holds the electrodes firmly in contact with the workpiece. As would be understood in the art, the force would vary according to the composition of the workpiece and the electrodes themselves. Further details of a suitable welding apparatus can be found in prior art documents, such as U.S. Pat. No. 5,789,719, which is incorporated by reference as if fully set forth herein. However, it must be kept in mind that the welding apparatus has been somewhat modified from that described in the '719 patent as the details thereof are not critical to the present invention.

As would be understood by one of ordinary skill in the art, a critical objective of any resistance/brazing operation is to properly account for the composition of electrodes 62, 72 and the workpiece to be brazed so that enough heat can be produced to melt an interface material (brazing material) 18 and bond the two components together. In particular, workpiece 15 may be comprised of two materials such as a tungsten layer 16 and a copper layer 17, with silver used as brazing material 18. For a proper brazing operation, brazing material 18 must reach its proper melting temperature for a proper length of time. The amount of time current is applied to the electrodes impacts the peak temperature of the brazing material. Too little time and the brazing material will not flow properly, while excessive heat may cause the brazing material to migrate to undesirable areas, and also could introduce annealing to workpiece 15.

Accordingly, in accordance with the present invention, sensor 20 which may be an infrared sensor, is provided within system 10. Sensor 20 which may be any type of non-contacting heat detecting sensor, is preferably mounted on a bracket 22 which may be fixedly secured to housing 42. Sensor 20 preferably includes a visible light source to assist in positioning the sensor at the correct position. Sensor 20 may also be selected as a function of the materials to be brazed, and therefore can vary accordingly. This selection will also vary according to the desired brazing material temperature to be measured. One of ordinary skill would, based on the present disclosure, be readily able to select the proper sensor. An electrical connection, via a wire 24, is preferably made between controller 30 and sensor 20.

Controller 30, as stated above, controls the welding/brazing operation in a manner well understood by one skilled in the art. Controller 30, which also interfaces with sensor 20, additionally monitors the temperature at the interface of the materials being brazed. The temperature is measured by sensor 20. As would be understood, the positioning of sensor 20 proximate workpiece 15 and the focusing thereof on the brazing material achieves the very precise non-contact measuring and monitoring of the brazing operation, in particular the melting of the brazing material.

In operation, the temperature of the brazing material can now be accurately measured by sensor 20 and monitored by controller 30. Controller 30 includes an interface unit (not shown) where the temperature set points are entered for the particular application. The interface unit outputs the signal to the current switch devices (not shown) in apparatus 40 to terminate the current. Controller 30 samples the data from sensor 20 and when in the correct threshold, it will disconnect current from current supply 82. Controller 30 can also send the data collected by sensor 20 to a main computer (not shown). The data can be, if desired, displayed on a monitor or printed through a printer. Controller 30 can now more accurately control the duration of the brazing operation and hence the temperature of interface material 18. By such a control operation, controller 30 can more accurately determine when the interfacing material has reached the proper interface alloy flow temperature and therefore, when the current to the electrodes should be terminated. When the flow of current stops the electrode force is maintained for a short period of time to allow the solidification of the brazing material to occur. In this way, the temperature of brazing material 18 is monitored independently of the electrode temperature, the electrode and/or material composition, and/or any corrosion formed thereon. Therefore the temperature of the brazing material and quality of the weld can be independently and accurately maintained.

It is also to be understood that the following claims are intended to cover all of the generic and specific features of the invention described herein and all statements of the scope of the invention which as a matter of language might fall therebetween.

It should also be understood that variations of the invention may be made without departing from the scope and spirit of the invention. For example, additionally positioned temperature sensors can be used in addition to the single sensor disclosed above to achieve an even more accurate and improved quality resistance welded product.

What we claim is:

1. A system for monitoring and controlling a welding/brazing operation on a workpiece, the workpiece comprising a first material, a second material spaced apart therefrom, and a brazing material disposed therebetween, the brazing material having a lower melting point than either of the first or second materials, the system comprising:

a welding apparatus having a first electrode and a second electrode spaced apart therefrom, current supply means for applying a current through the first electrode, the brazing material, and the second electrode sufficient to melt the brazing material;

a controller for controlling the brazing operation, the controller for controlling current flow through the workpiece; and non-contact sensor means, coupled to the controller, for measuring the temperature of the brazing material;

wherein upon a predetermined temperature of the brazing material as measured by the non-contact sensor means, the controller causes the current supply means to terminate the application of current to the workpiece.

2. The system as claimed in claim 1, wherein the non-contact sensor means includes at least one infrared sensor positioned proximate the brazing material when the first electrode is in contact with the first material and the second electrode is in contact with the second material and the current supply means is applying a current therethrough sufficient to melt the brazing material.

3. The system as claimed in claim 1, wherein the first material comprises tungsten and the second material comprises copper and the brazing material comprises silver.

4. A method for monitoring and controlling a welding/brazing operation on a workpiece using a welding apparatus, the workpiece comprising a first material, a second material, and a brazing material disposed therebetween, the brazing material having a lower melting point than either of the first or the second materials, the method comprising the steps of:

applying a current flow from a current supply means through the brazing material;

measuring a temperature of the brazing material; and upon a detection of only a predetermined temperature of the brazing material as measured by a non-contact sensor means, terminating the current flow through the brazing material.

5. A method for monitoring and controlling a welding/brazing operation on a workpiece using a welding apparatus having a first and a second electrode, the workpiece comprising a first material, a second material, and a brazing material disposed therebetween, the brazing material having a lower melting point than either of the first or the second materials, the method comprising the steps of:

clamping the workpiece between the first and the second electrodes;

aligning non-contact sensor means proximate the brazing material of the workpiece;

applying a current flow from current supply means through the first electrode, the brazing material and the second electrode;

measuring a temperature of the brazing material; and upon a detection of only a predetermined temperature of the brazing material as measured by non-contact sensor means, terminating the current flow through the first electrode, the brazing material and the second electrode.

6. The method as set forth in claim 5, wherein the sensor means includes a visible light source and the step of aligning includes the steps of:

illuminating a location of the brazing material;

detecting the illuminated location; and positioning the non-contact sensor proximate the illuminated position.

7. The method as set forth in claim 5, further including the steps of:

providing a micro-processing unit, operatively coupled to the current supply means and the non-contact sensor means, having stored therein predetermined temperature set points for a welding/brazing operation of interest;

sampling data detected by the non-contact sensor;

comparing the sampled data to the predetermined temperature set points; and when the sampled data corresponds to a specified one of the predetermined temperature set points, signaling the current supply means to terminate the current flow.

8. The method as set forth in claim 5, wherein the termination of the current flow is determined by the temperature of the brazing material and to the exclusion of all other criteria on which termination of the current flow can be based.

* * * * *